(12) United States Patent
Batarseh et al.

(10) Patent No.: US 12,226,852 B2
(45) Date of Patent: Feb. 18, 2025

(54) LASER TOOL FOR REMOVING SCALING

(71) Applicant: Saudi Arabian Oil Company, Dhahran (SA)

(72) Inventors: Sameeh Issa Batarseh, Dhahran (SA); Wisam Jamal Assiri, Dhahran (SA); Haitham A. Othman, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 371 days.

(21) Appl. No.: 17/366,508

(22) Filed: Jul. 2, 2021

(65) Prior Publication Data

US 2021/0331278 A1 Oct. 28, 2021

Related U.S. Application Data

(62) Division of application No. 16/141,721, filed on Sep. 25, 2018, now Pat. No. 11,090,765.

(51) Int. Cl.
*E21B 7/15* (2006.01)
*B23K 26/36* (2014.01)
*B23K 26/38* (2014.01)

(52) U.S. Cl.
CPC .................. *B23K 26/36* (2013.01)

(58) Field of Classification Search
CPC .......... E21B 43/11; E21B 7/14; B23K 26/064
See application file for complete search history.

(56) References Cited

U.S. PATENT DOCUMENTS

| 3,843,865 A | 10/1974 | Nath |
| 4,623,229 A | 11/1986 | Galan |
| 4,920,994 A | 5/1990 | Nachbar |
| 5,736,709 A | 4/1998 | Neiheisel |
| 5,948,172 A | 9/1999 | Neiheisel |
| 6,281,489 B1 * | 8/2001 | Tubel .................. G01V 1/52 166/250.15 |
| 6,307,191 B1 | 10/2001 | Waycuilis |
| 6,343,652 B1 | 2/2002 | Corre et al. |
| 6,437,285 B1 | 8/2002 | Thomas et al. |
| 6,880,646 B2 | 4/2005 | Batarseh |

(Continued)

FOREIGN PATENT DOCUMENTS

| CN | 1224644 A | 8/1999 |
| CN | 206662539 U | 11/2017 |

(Continued)

OTHER PUBLICATIONS

Halocarbon, Halocarbon 27 Oil (2020), <https://halocarbon.com/engineered-fluids/compressor-fluids/halocarbon-27-oil>. Retrieved on Mar. 8, 2021.

(Continued)

*Primary Examiner* — Dana Ross
*Assistant Examiner* — Lawrence H Samuels
(74) *Attorney, Agent, or Firm* — Osha Bergman Watanabe & Burton LLP (57) ABSTRACT

An example laser tool includes a laser head to output a laser beam and a robotic arm that is articulated and that is connected to the laser head. The robotic arm includes segments that are connected by flexible joints to enable movement of the laser head in six degrees of freedom. A control system is configured to control the robotic arm to direct output of the laser beam.

23 Claims, 5 Drawing Sheets

(56) References Cited

U.S. PATENT DOCUMENTS

| | | | |
|---|---|---|---|
| 6,888,097 B2* | 5/2005 | Batarseh | B23K 26/064 |
| | | | 175/11 |
| 8,307,900 B2* | 11/2012 | Lynde | E21B 47/002 |
| | | | 166/126 |
| 8,464,794 B2* | 6/2013 | Schultz | E21B 43/11 |
| | | | 166/250.1 |
| 8,678,087 B2 | 3/2014 | Schultz et al. | |
| 9,089,928 B2* | 7/2015 | Zediker | B23K 26/0096 |
| 9,399,269 B1* | 7/2016 | Zediker | E21B 29/00 |
| 9,759,031 B2 | 9/2017 | Bakri et al. | |
| 9,932,803 B2 | 4/2018 | Batarseh et al. | |
| 10,053,967 B2* | 8/2018 | Deutch | E21B 43/11 |
| 10,087,692 B2 | 10/2018 | Al Dabbous et al. | |
| 11,090,765 B2 | 8/2021 | Batarseh et al. | |
| 2003/0230408 A1* | 12/2003 | Acock | E21B 43/11 |
| | | | 166/308.1 |
| 2004/0206505 A1 | 10/2004 | Batarseh | |
| 2004/0256103 A1* | 12/2004 | Batarseh | B23K 26/128 |
| | | | 166/55.1 |
| 2006/0102343 A1 | 5/2006 | Skinner et al. | |
| 2006/0278359 A1 | 12/2006 | Wheaton et al. | |
| 2008/0166132 A1* | 7/2008 | Lynde | E21B 47/002 |
| | | | 398/142 |
| 2009/0205675 A1 | 8/2009 | Sarkar et al. | |
| 2009/0222209 A1 | 9/2009 | Morys | |
| 2009/0314753 A1 | 12/2009 | Kosmowski | |
| 2010/0044102 A1 | 2/2010 | Rinzler et al. | |
| 2010/0200233 A1* | 8/2010 | Yeh | E21B 43/082 |
| | | | 166/278 |
| 2010/0258289 A1* | 10/2010 | Lynde | E21B 23/14 |
| | | | 166/55.7 |
| 2010/0301013 A1* | 12/2010 | Conneely | B23K 26/142 |
| | | | 427/212 |
| 2010/0326659 A1* | 12/2010 | Schultz | E21B 29/06 |
| | | | 166/297 |
| 2011/0290563 A1* | 12/2011 | Kocis | E21B 7/14 |
| | | | 175/57 |
| 2012/0074110 A1* | 3/2012 | Zediker | E21B 10/60 |
| | | | 219/121.72 |
| 2012/0118568 A1 | 5/2012 | Kleefisch et al. | |
| 2013/0319984 A1 | 12/2013 | Linyaev et al. | |
| 2014/0050861 A1* | 2/2014 | Vaidyanathan | C23C 16/545 |
| | | | 118/620 |
| 2014/0069658 A1* | 3/2014 | Cain | E21B 19/006 |
| | | | 166/355 |
| 2014/0090846 A1 | 4/2014 | Deutch et al. | |
| 2014/0263223 A1* | 9/2014 | Unrath | B23K 26/386 |
| | | | 219/121.81 |
| 2014/0360778 A1 | 12/2014 | Batarseh | |
| 2015/0021008 A1 | 1/2015 | Batarseh | |
| 2015/0021013 A1 | 1/2015 | Batarseh | |
| 2015/0129203 A1* | 5/2015 | Deutch | E21B 43/119 |
| | | | 166/250.1 |
| 2015/0211314 A1* | 7/2015 | McAfee | E21B 29/00 |
| | | | 166/250.01 |
| 2016/0069857 A1 | 3/2016 | Batarseh et al. | |
| 2016/0084008 A1* | 3/2016 | Faircloth | B23K 26/382 |
| | | | 175/16 |
| 2016/0139593 A1* | 5/2016 | Willett | G05B 19/41875 |
| | | | 700/109 |
| 2016/0160618 A1* | 6/2016 | Batarseh | E21B 7/14 |
| | | | 175/16 |
| 2016/0247316 A1* | 8/2016 | Whalley | E21B 17/02 |
| 2016/0251940 A1* | 9/2016 | De Witt | E21B 7/14 |
| | | | 166/304 |
| 2016/0273325 A1* | 9/2016 | Montaron | E21B 43/2405 |
| 2016/0326839 A1 | 11/2016 | Ayub et al. | |
| 2017/0016291 A1 | 1/2017 | Al Dabbous et al. | |
| 2017/0074447 A1 | 3/2017 | Batarseh et al. | |
| 2017/0111112 A1 | 4/2017 | San Martin et al. | |
| 2017/0130570 A1 | 5/2017 | Al-Nakhli et al. | |
| 2017/0292329 A1* | 10/2017 | Hayik | E21B 7/06 |
| 2018/0003001 A1 | 1/2018 | Pipchuk et al. | |
| 2018/0042111 A1 | 2/2018 | Difoggio et al. | |
| 2018/0045024 A1 | 2/2018 | Deutch et al. | |
| 2018/0163524 A1 | 6/2018 | Batarseh | |
| 2018/0266226 A1 | 9/2018 | Batarseh et al. | |
| 2018/0270920 A1 | 9/2018 | Batarseh | |
| 2018/0272467 A1* | 9/2018 | Montaron | B23K 26/38 |
| 2018/0306010 A1 | 10/2018 | Von Kaenel et al. | |
| 2020/0094352 A1 | 3/2020 | Batarseh et al. | |

FOREIGN PATENT DOCUMENTS

| | | |
|---|---|---|
| EP | 1769879 A1 | 4/2007 |
| FR | 2763992 A1 | 12/1998 |
| JP | H02-133188 A | 5/1990 |
| WO | WO-98/54440 A1 | 12/1998 |
| WO | WO-2016/090229 A1 | 6/2016 |
| WO | WO-2020/065386 A1 | 4/2020 |

OTHER PUBLICATIONS

International Search Report for PCT/IB2018/058920, 7 pages (mailed Jul. 18, 2019).

Written Opinion for PCT/IB2018/058920, 8 pages (mailed Jul. 18, 2019).

* cited by examiner

LASER TOOL FOR REMOVING SCALING

CROSS-REFERENCE

This application is a divisional application of U.S. patent application Ser. No. 16/141,721 filed Sep. 25, 2018.

TECHNICAL FIELD

This specification relates generally to example laser tools for removing scaling from objects, such as metal pipes.

BACKGROUND

Scaling includes deposits of inorganic material that coat metal pipes and other objects. Scaling can be caused by a chemical reaction, a change in pressure and temperature, or a change in composition of a solution within a pipe. A build-up of scaling can decrease the flow of fluid through a pipe or completely block the flow of fluid. This can be problematic, particularly in cases where the pipes are located underground and, therefore, are not easily accessible.

SUMMARY

An example laser tool includes a laser head to output a laser beam and a robotic arm that is articulated and that is connected to the laser head. The robotic arm includes segments that are connected by flexible joints to enable movement of the laser head in six degrees of freedom. A control system is configured to control the robotic arm to direct output of the laser beam. The laser tool may include one or more of the following features, either alone or in combination.

The laser tool may include a laser source to generate the laser beam and fiber optics through which the laser beam passes to reach the laser head. At least part of the fiber optics may be within the robotic arm. The control system may include a computing system located remotely from the laser tool. A stabilizer may secure part of the robotic arm against a structure within a confined space. The stabilizer may include a holder to contain the robotic arm and support arms connected to the holder. The support arms may be controllable move to relative to the robotic arm. Pads may be connected to the support arms. The support arms may be controllable to move the pads so that the pads contact a surface of the confined space to maintain the holder at set position within the confined space.

The laser tool may include an elongated structure configured to mount to the robotic arm. The elongated structure may be configured for connection to a device for lowering the laser tool into a wellbore.

The laser tool may include one or more sensors to sense environmental conditions in a region where the laser tool operates. The one or more sensors may be configured to provide data based on the environmental conditions to the control system. The control system may be configured to use the data to affect operation of the laser tool. The sensors may include one or more of a temperature sensor to sense temperature and an acoustic sensor to sense sound. The sensors may include an acoustic camera configured to obtain data based on acoustics in the region where the laser tool operates.

The laser tool may include one or more head purging nozzles located inside the laser head. The head purging nozzles may be configured to output a purging medium within the laser head. The laser tool may include one or more target purging nozzles located outside the laser head. The target purging nozzles may be configured to output a purging medium towards a target of the laser beam.

The laser tool may include an optical assembly within the laser head to shape the laser beam prior to output and a vacuum connected to the robotic arm. The vacuum may be configured to suction material away from the laser head. An optical power of the laser beam may be between 1 kilowatt (kW) and 10 kW.

An example method of removing scaling from an object within a confined space uses a laser tool having a robotic arm and a laser head connected to the robotic arm to output a laser beam. The object may be a metal pipe. The confined space may be an interior of the metal pipe. The method includes moving the laser tool into the confined space and controlling the robotic arm to move in at least three degrees of freedom within the confined space in order to direct a laser beam to remove the scaling from the object. The method may include one or more of the following features, either alone or in combination.

Controlling the robotic arm may include controlling the robotic arm to move in at least four degrees of freedom, to move in at least five degrees of freedom, or to move in six degrees of freedom. Controlling the robotic arm may include moving the robotic arm in a spiral pattern or in a circular pattern. Directing the laser beam for removal of the scaling may include pointing the laser beam at the scaling or pointing the laser beam at a surface of the object adjacent to the scaling. The scaling removed from the object may be suctioned away from the laser head using a vacuum. The method may include outputting a purging medium towards the scaling during removal of the scaling by the laser tool.

The method may include monitoring environmental conditions within the confined space during removal of the scaling by the laser tool. Control over the robotic arm may be based at least in part on the environmental conditions. The environmental conditions may include one or more a temperature within the confined space, pressure within the confined space, or sound within the confined space.

The method may include securing at least part of the robotic arm against the object during removal of the scaling. The at least part of the robotic arm may be centered within the confined space during removal of the scaling, An optical power of the laser may be between 1 kilowatt (kW) and 10 kW. The laser beam may be shaped prior to output. Shaping the laser beam may include at least one of focusing the laser beam, collimating the laser beam, or dispersing the laser beam.

Any two or more of the features described in this specification, including in this summary section, may be combined to form implementations not specifically described in this specification.

At least part of the tools and processes described in this specification may be controlled by executing, on one or more processing devices, instructions that are stored on one or more non-transitory machine-readable storage media. Examples of non-transitory machine-readable storage media include read-only memory (ROM), an optical disk drive, memory disk drive, and random access memory (RAM). At least part of the tools and processes described in this specification may be controlled using a data processing system comprised of one or more processing devices and memory storing instructions that are executable by the one or more processing devices to perform various control operations.

The details of one or more implementations are set forth in the accompanying drawings and the description subsequently. Other features and advantages will be apparent from the description and drawings, and from the claims.

DESCRIPTION OF THE DRAWINGS

Like reference numerals in different figures indicate like elements.

DETAILED DESCRIPTION

Described in this specification are example laser tools for removing scaling from objects, such as metal pipes, and example methods for removing scaling using those tools. An example laser tool includes a laser head to output a laser beam. The laser beam may be generated locally or remotely and transmitted to the laser head. The laser tool includes a robotic arm that is articulated and that is connected to the laser head. The robotic arm includes segments that are connected by flexible joints to enable movement of the laser head in six degrees of freedom. This movement enables the laser tool to treat scaling from various angles and to apply the laser beam to the scaling in various patterns, such as circles or spirals.

When applied directly to the scaling, the laser beam removes scaling through sublimation, spallation, or both. Sublimation includes changing scaling from a solid phase directly into a gaseous phase without first changing into a liquid phase. Spallation includes breaking the scaling into small pieces. The laser tool may also target areas adjacent to the scaling to cause those areas to expand and the scaling to detach as a result. A control system controls the robotic arm to direct output of the laser beam based on factors such as the extent of the scaling, the location of the scaling, and environmental conditions in a region to be treated.

Figure 1:
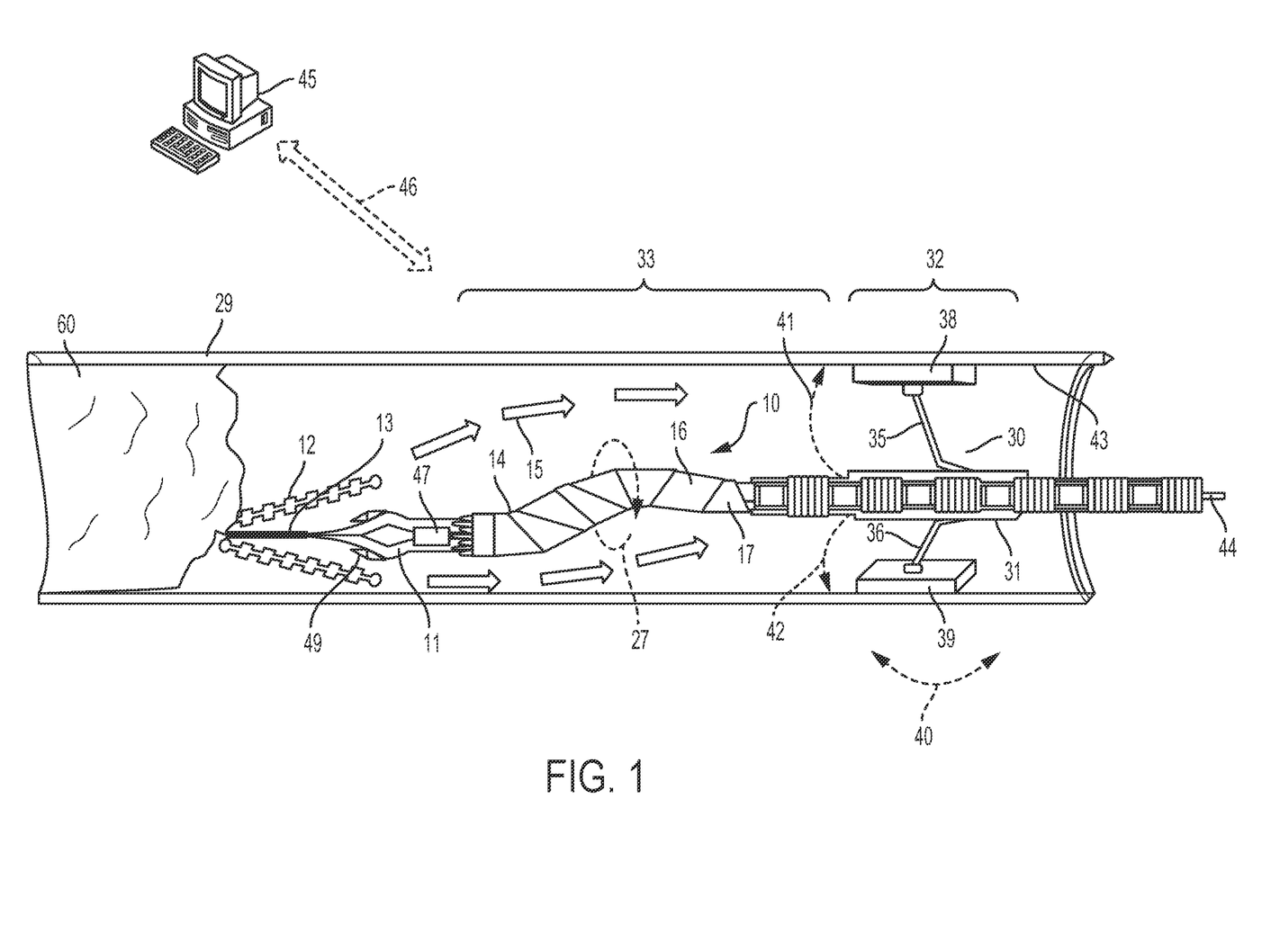
FIG. 1 is a side view of an example laser tool within the cross-section of a metal pipe targeting scaling directly with a laser beam.

FIG. 1 shows an example implementation of a laser tool of the type described in the preceding paragraphs. Laser tool 10 includes a laser head 11. Laser head 11 is configured to receive a laser beam from a source and to output the laser beam 13. Laser head 11 may house an optical assembly. The optical assembly includes optics, such as mirrors, lenses, or both mirrors and lenses to direct the laser beam, to shape the laser beam, and to size the laser beam. For example, the optical assembly may include one or more lenses to focus the laser beam, to collimate the laser beam, or to spread the laser beam to cause the laser beam to diverge.

In a collimated laser beam, the laser beam maintains a constant cross-sectional area as it propagates. The power intensity of a collimated laser beam is also typically constant. Collimated laser beams may be most appropriate for penetrating blockages or other scaling deposits that completely block a pipe or other object. A focused laser beam decreases in cross-sectional area as it propagates to provide an increased power intensity at its focal point. Focused laser beams may be most appropriate for addressing small accumulations of scaling that require additional energy to dislodge. A divergent laser beam increases in cross-sectional area as it propagates. Divergent laser beams may be most appropriate for spreading heat over the entire surface of a scaling deposit.

Figure 2:
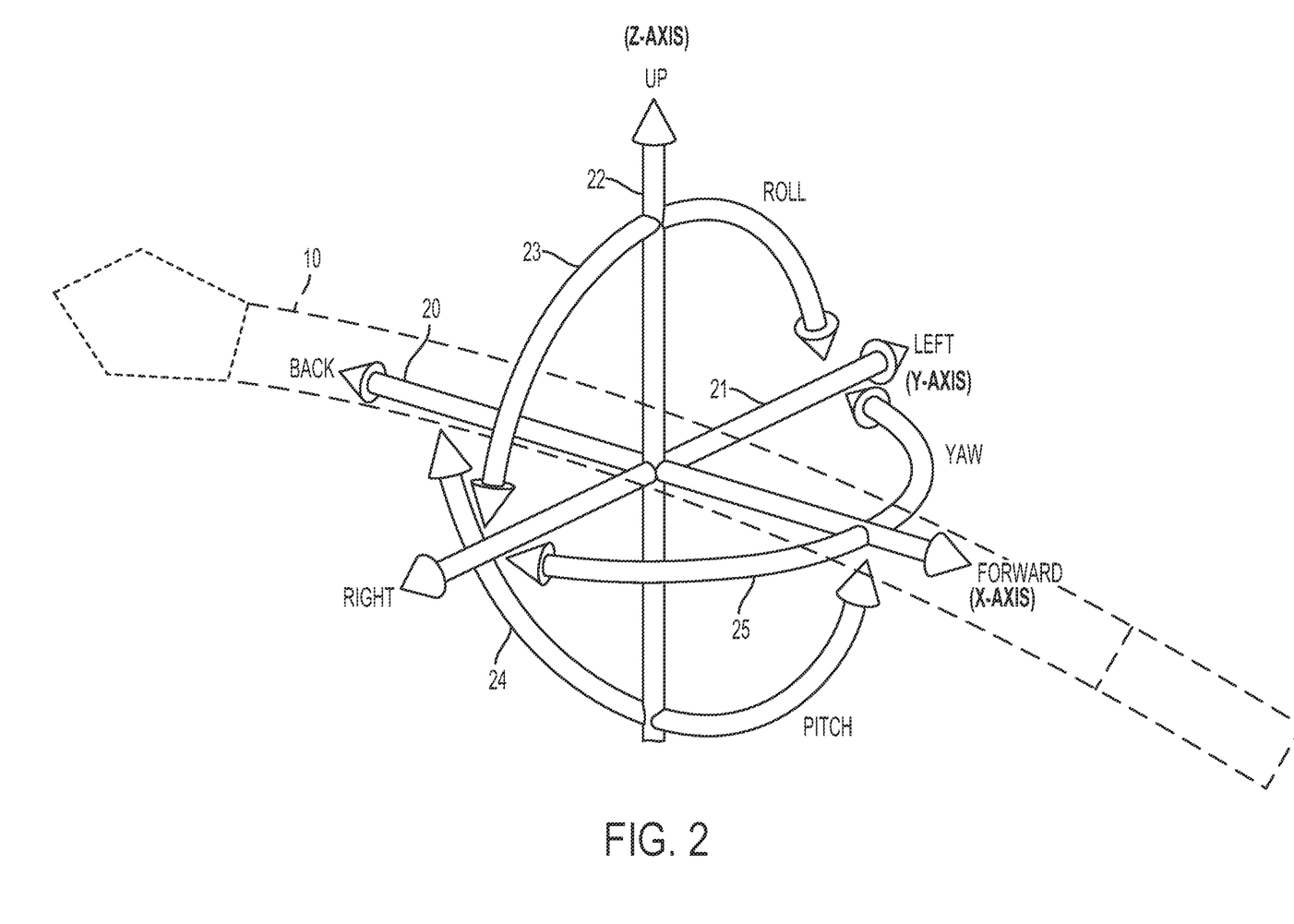
FIG. 2 is a block diagram showing six degrees of freedom and the example laser tool superimposed over the block diagram.

Laser head 11 is connected to robotic arm 14. Robotic arm 14 is articulated and includes segments that are connected by flexible joints to enable movement of the laser head. Examples of segments include segments 16 and 17. Adjacent segments have complementary mating mechanisms to allow connection in series. In some implementations, the segments are connected to enable movement of the laser head in six degrees of freedom. In Cartesian XYZ space, the six degrees of freedom include: (1) moving forward and backward on the X-axis, (2) moving left and right on the Y-axis, (3) moving up and down on the Z-axis, (4) tilting side-to-side over the X-axis, (5) tilting forward and backward over the Y-axis, and (6) tilting left and right over the Z-axis. These six degrees of freedom are known as surge, sway, heave, roll, pitch, and yaw, respectively. FIG. 2 uses arrows to show potential movements of laser tool 10 (shown in dashed lines) along the surge 20, sway 21, heave 22, roll 23, pitch 24, and yaw 25 degrees of freedom. The robotic arm is also rotatable about its longitudinal axis (the X-axis of FIG. 2) as represented by arrow 27 of FIG. 1.

Movement of individual segments may be controlled using motors or hydraulics. For example, each segment may include a motor and associated electronics. The electronics may be configured to receive commands from a control system and to control operation of the motors based on the commands.

The robotic arm is modular in the sense that segments may be added to the robotic arm or removed from the robotic arm to change its length. Segments may be added to the robotic arm in order to target scaling deposits located deeper within a space. Segments may be removed from the robotic arm in cases where increased depth is not needed. In some implementations, the number of segments that make up the robotic arm may be based on the length of a pipe to be treated. The robotic arm may be assembled prior to use by connecting multiple segments together using connection mechanisms. For example, segments may be screwed together or connected using clamps, bolts, or screws. The segments are configured—for example, constructed or assembled—to bend around contours of a pipe or other confined space during insertion and removal.

The laser tool may be used to remove scaling from pipes that are located underground. For example, the laser tool may be used to remove scaling from metal pipes in a water well or hydrocarbon well. Going forward, a metal pipe (or simply "pipe") is used as the example object from which scaling is removed.

As shown in FIG. 1, the laser tool may operate within the interior a pipe 29 to be treated using the laser tool. The interior of the pipe is a confined space in that the interior surface of the metal pipe restricts movement of the laser tool. The laser tool may be moved into the pipe using a coiled tubing unit, a wireline, or a tractor. In some implementations, the laser tool also may be configured to mount to an elongated structure (not shown) that fits within the pipe and that allows the laser tool to reach scaling deposits that could not be reached with the laser tool alone. In some implementations, the elongated structure having the laser tool attached may be moved into the pipe using the coiled tubing unit, the wireline, or the tractor. In some implementations, the laser tool can operate at a depth or reach of about 2 kilometers (km) depending upon the optical power of the laser beam. In some implementations, the optical power of the laser beam is between 1 kilowatt (kW) and 10 kW.

The laser tool may include one or more stabilizers to secure part of the robotic arm against the interior surface of the pipe. FIG. 1 shows an example stabilizer 30. Stabilizer 30 includes a holder 31 to contain part 32 of robotic arm 14. The holder is shown in cross-section in the figures. The holder may include a tube or other hollow structure through which the robotic arm threads. The holder may be made of plastic or metal and has sufficient rigidity to constrain movement of part 32 of the robotic arm. For example, the holder may keep part 32 of the robotic arm centered in the pipe. However, the holder does allow for one dimensional translational (linear) and rotational movement of the robotic arm. Also, while the holder limits movement of part 32 of the robotic arm, it does not limit movement of the part 33 of the robotic arm that positions the laser head to remove the scaling.

Stabilizer 30 also includes arms 35 and 36 that are connected, respectively, to pads 38 and 39. The pads may be mounted pivotally on their respective arms to enable at least partial rotation or pivot along arrow 40. The arms are controllable to expand outward from the holder along the directions of arrows 41, 42 to the position shown in FIG. 1. This movement forces the pads against the inner surface 43 of pipe 29 in the example of FIG. 1. The pads may have sufficient pliability to conform to an uneven or nonaligned surface to maximize their surface contact. Additionally, the rotation of the pads along arrow 40 promotes maximal contact to uneven or nonaligned surfaces. The stabilizer thus anchors the robotic arm within pipe 29.

Optical transmission media, such as fiber optic cables 44, deliver the laser beam from a laser source to laser head 11. In some implementations, at least part of the fiber optic cables pass through, and are contained within, robotic arm 14. Thus, the fiber optic cables may be protected by the structure of the robotic arm. The fiber optic cables extend from the laser head to the laser source. The laser source is remote from the laser head. In some implementations, the laser source is physically separate from the robotic arm. For example, in implementations of the laser tool that remove scaling from pipes downhole in a well, the laser source may be located at a surface above the wellbore. In implementations of the laser tool that remove scaling from pipes or other confined spaces that are on the surface or not within the depths of a well, the laser source may be located outside of the pipes or confined spaces. In some implementations, the laser source may be connected to, or mounted on, the robotic arm. For example, the laser source may be mounted to an end of the robotic arm that is opposite to the end that holds the laser head.

The laser source may include a laser generator. In some implementations, the laser generator is configured to generate a ytterbium multi-clad fiber laser. However, laser generators that generate other types of lasers may be used. Examples of these other types of lasers include erbium lasers, neodymium lasers, dysprosium lasers, praseodymium lasers, and thulium lasers. The lasers may be pulsed or continuous.

An example laser generator is a direct diode laser. Direct diode lasers include laser systems that use the output of laser diodes directly in an application. This is in contrast to other types of lasers in which the output of laser diodes is used to pump another laser to generate an output. Examples of direct diode lasers include systems that generate straight-line beam shapes. A straight-line beam shape includes lasers that travel directly from one point to another. A straight-line beam shape also includes lasers beams having a cross-sectional diameter that stays the same or that changes during travel.

Laser tool 10 may include one or more sensors 47 to sense environmental conditions in a region where the laser tool operates. For example, if the laser tool operates in a pipe within a well, the sensors obtain data about environmental conditions within the pipe. The sensors are configured to provide data based on the environmental conditions to a control system. The control system may use this data to generate information about the progress of the tool in removing scaling or the control system may use this data to adjust or cease operation of the tool. Transmission media such as fiber optics or Ethernet may run between the sensors and the control system to transmit data from the sensors to the control system or from the control system to the sensors. The transmission media may run along the length of the robotic arm. In some implementations, data exchange between the sensors and the control system may be implemented wirelessly.

Examples of the environmental sensors may include temperature sensors to measure temperature in a region of the tool's operation, pressure sensors to measure pressure in a region of the tool's operation, and vibration sensors to measure vibrations levels in a region of the tool's operation. The control system may receive signals from one or more of these sensors. The signals received from the sensors may indicate that there are problems in the region or that there are problems with the laser tool. An operator may take corrective action based on these signals. For example, if a temperature or a pressure is such that the laser tool may be damaged, the laser tool may be withdrawn. For example, if the laser tool is not operating correctly, it may be withdrawn and adjusted or repaired.

In some implementations, the laser tool may include acoustic sensors for obtaining acoustic data or an acoustic camera for obtaining acoustic data and capturing images or video. The acoustic sensors may be located along the robotic arm or on the laser head. The acoustic camera may be located along the robotic arm or on the laser head. Data obtained from the acoustic sensors or the acoustic camera may be sent to the control system. There, the data may be processed to monitor or to view laser tool operation in real-time. Real-time images or video of the operation of the laser tool may be rendered on a display screen. In this regard, real-time may not mean that two actions are simultaneous, but rather may include actions that occur on a continuous basis or track each other in time, taking into account delays associated with data processing, data transmission, and hardware.

At the control system, the data also may be processed to determine downhole conditions. Data captured by the acoustic sensors or acoustic camera may include velocities of sound waves traveled and reflected in a region where the scaling is located. This information may used to determine mechanical properties of the scaling including its stability, to evaluate performance of the laser tool, and to control movement of the laser tool and troubleshooting of the laser tool. For example, if an image shows that the laser tool is not targeting the scaling, the control system may move the laser tool to change its target. For example, if the acoustic data indicates the presence of unexpected scaling or other material in a pipe, operation of the laser tool may be changed to account for these conditions. The intensity of the laser beam may be increased in this case. Alternatively or in addition, the pattern of impact of the laser beam may be changed. In another example, if the acoustic data indicates that the tool is stuck, actions may be taken to free the tool.

The control system may include a computing system 45 that is located remotely from the laser tool. The computing system may be configured—for example, programmed—to control operation of the laser tool, to analyze data from the sensors or acoustic camera, and to output information based on the analysis. In implementations of the laser tool that remove scaling from pipes downhole in a well, the computing system may be located at a surface above the wellbore. In implementations of the laser tool that remove scaling from pipes or other confined spaces that are on the surface or not within the depths of a well, the computing system may be located outside of the pipes or confined spaces.

Signals may be exchanged between computing system 45 and components of the laser tool via wired or wireless connections. In an example, communication media such as Ethernet or other wiring may carry commands and data to and from the laser tool. The commands may be generated by the computing system. The commands may control operation of the tool. For example, the commands may include commands to start operation of the laser tool, to end operation of the laser tool, to change the intensity of the laser beam, to change the shape of the laser beam, or to change the direction of the laser beam to target a different location. In some implementations, the commands may instruct movement of the laser head in one, two, three, four, five, or six degrees of freedom. Segments and other components of the robotic arm may include local electronics capable of receiving and executing operations defined by the commands. Dashed arrow 46 represents communications between the laser tool and the computing system.

The control system may include electronics or an on-board computing system to implement control over the positioning and operation of the laser tool. The on-board computing system is "on-board" in the sense that it is located on the tool itself or downhole with the tool, rather than at the surface. The electronics or on-board computing system may communicate with computing system 45 to control operation and movement of the laser tool. For example, the on-board computing system may cooperate with computing system 45 to control operation of the laser tool based on sensor readings as described previously. Alternatively, the electronics or on-board computing system may be used instead of computing system 45. For example, the electronics or on-board computing system may be configured—for example programmed—prior to operation to implement control instructions in a sequence during operation absent user intervention. The on-board computing system may perform all or some of the operations attributed to computing system 45.

Laser tool 10 includes one or more target purging nozzles 49 located outside of laser head 11. The target purging nozzles are configured to output a purging medium towards a target of the laser beam. The purging medium is output forcefully to the target of the laser beam and is output while the laser beam is being applied to the target. The purging medium moves debris 12, such as scaling, out of the way of the laser beam. Arrows 15 depict movement of debris 12 out of the way or the laser beam and around the robotic arm. The purging medium also may reduce the temperature of adjacent structures, such as metal pipe. The purging medium may be a liquid, a gas, or both a liquid and a gas. For example, the purging medium may include a non-reactive, inert gas such as nitrogen. For example, the purging medium may include a liquid such as halocarbon. A halocarbon includes a compound, such as a chlorofluorocarbon, that incudes carbon combined with one or more halogens. Examples of halocarbon include halocarbon-oil having viscosities in a range from 0.8 centipoise (cP) to 1000 cP at 100 degrees (°) Fahrenheit (37.8° Celsius). In some implementations, purging may be cyclical. For example, purging may occur only while the laser beam is on.

Laser tool 10 includes one or more head purging nozzles (not shown) located inside of laser head 11. The head purging nozzles are configured to output a purging medium within the laser head. The head purging nozzles may output the purging medium forcefully while the laser beam is being applied to the target. The output purging medium clears a path for the laser beam within the head by removing debris and other materials within or near the head. The output purging medium also may prevent the debris and other materials from contaminating the optical assembly. Furthermore, the purging medium is heated by the laser beam within the head and output from the head with the laser beam. The purging medium may therefore also assist in removal of debris and other materials from a treatment site. The purging medium may be a liquid, a gas, or both a liquid and a gas. For example, the purging medium may include a non-reactive, inert gas such as nitrogen. For example, the purging medium may include a liquid such as halocarbon. In some implementations, purging using the head purging nozzles may be cyclical. For example, purging may occur only while the laser beam is on.

Figure 3:
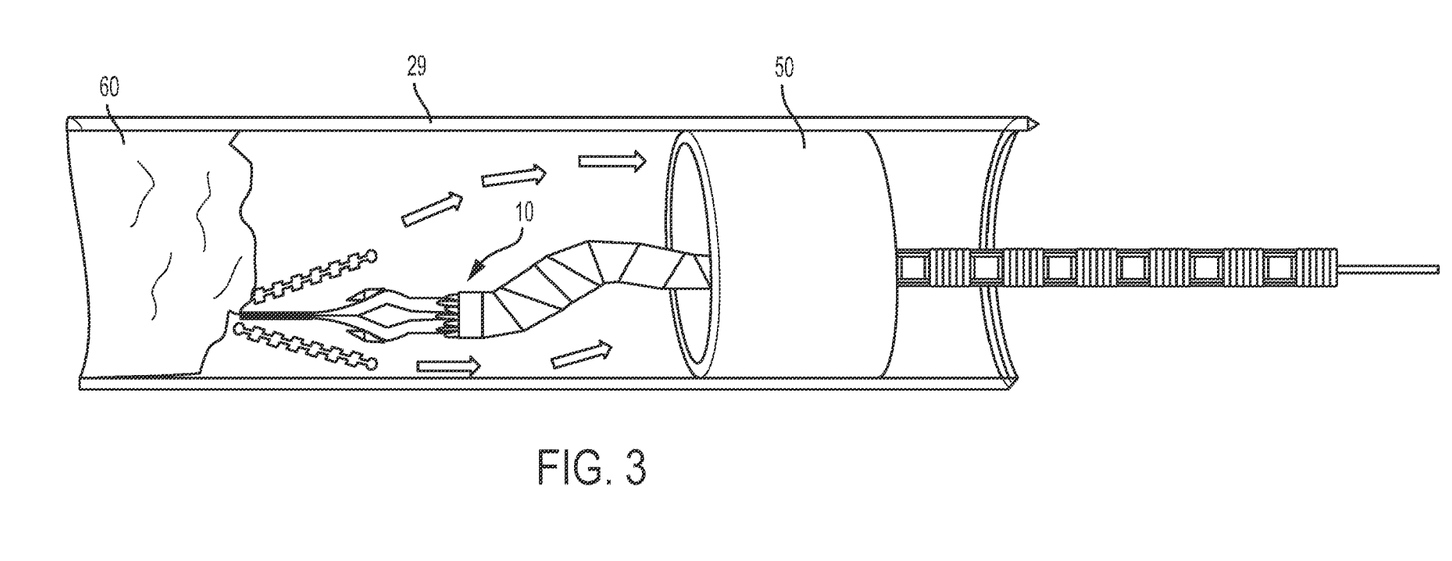
FIG. 3 is a side view of the example laser tool coupled with a vacuum within the cross-section of a metal pipe.

In some implementations, laser tool 10 may include an on-board vacuum system to assist in removing debris and other materials from a treatment site. An example of a vacuum 50 integrated into laser tool 10 is shown in FIG. 3. In some implementations, the vacuum may operate with a suction force of −15 pounds-per-square-inch gauge (psig) (204.7 kilopascal (kPa)). Operation of the vacuum may be controlled by the control system. The vacuum may suction debris and other materials away from the treatment site. In some implementations, tubing (not shown) may transport the debris or other materials outside of the pipe.

Figure 4:
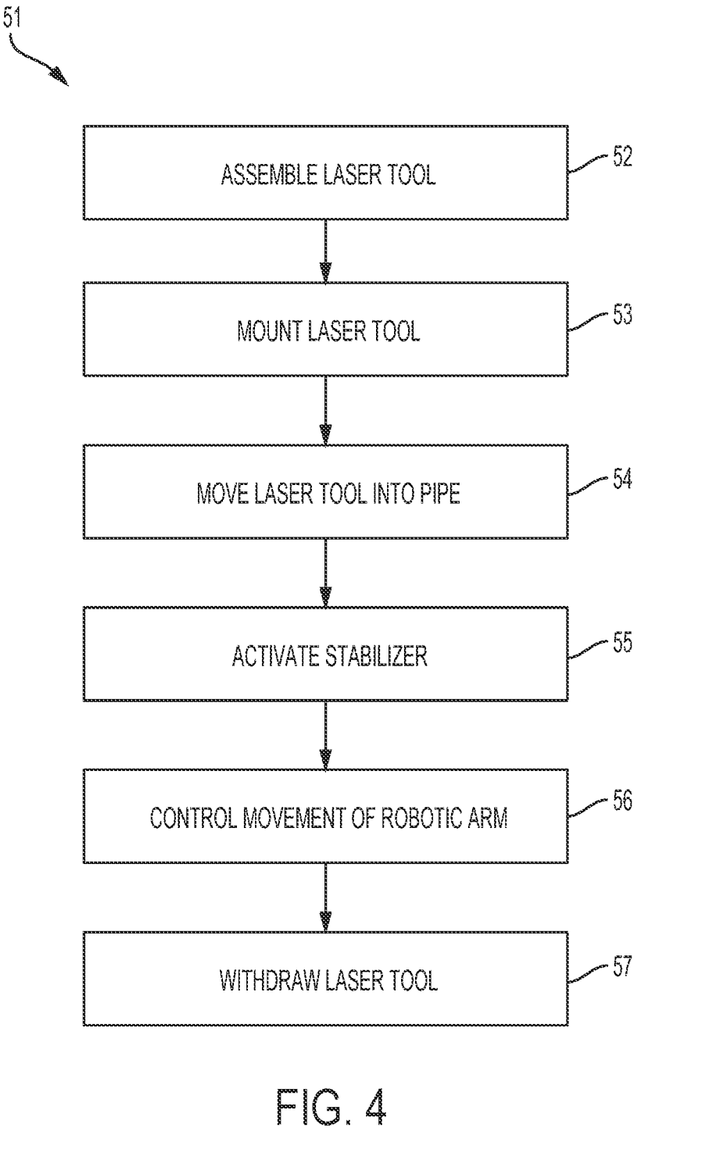
FIG. 4 is a flow chart of an example process for removing scaling from an object using the example laser tool.

FIG. 4 shows an example process 51 for removing scaling from within a metal pipe using a laser tool, such as laser tool 10. Initially, the laser tool is assembled (52). The laser tool is assembled by connecting a string of two or more segments in series. The length of the laser tool may correspond to the location of a site of scaling to be removed by the laser tool. In some implementations, the length of the laser tool may be one meter. In some implementations, the length of the laser tool may be two, three, four, five, six, or seven meters depending upon how far the laser tool needs to reach within the pipe.

The laser tool is mounted (53) to an elongated structure for movement towards its target. The elongated structure may be a pipe made of metal, composite, or plastic that is configured to bend around contours. For example, the elongated structure may be made of a flexible material, such as flexible tubing. This operation may be omitted if the laser tool's target can be reached without the additional length provided by the elongated structure.

The laser tool—mounted or not to the elongated structure—is moved (54) into the pipe and towards the scaling to be treated. If the pipe is located downhole of a well, the laser tool may be lowered into the wellbore using a coiled tubing unit, a wireline, or a tractor as noted. The tool may be moved into position by operation of the coiled tubing unit, wireline, or tractor. For example, the tool may be moved through the wellbore to reach the entry to the pipe and then enter and move through the pipe to the point where the scaling is located. The path may be determined beforehand based on knowledge about the length of the wellbore, the location of the pipe within the wellbore, and the location of the scaling within the pipe.

Once near to position, the stabilizer is activated (55) to secure part of the robotic arm of the tool to the inner surface of the pipe. As explained, the arms of the stabilizer move outward so that the pads forcefully contact the inner surface of the pipe. In this way, the stabilizer keeps part the robotic arm centered in the pipe. As explained, the stabilizer limits movement of part of the robotic arm. However, the stabilizer does allow for translational and rotational movement of the robotic arm within and through the stabilizer to enable movement of the laser head in one or more degrees of freedom to treat the scaling using a laser beam.

When in position, the robotic arm is controlled (56) to move in one or more degrees of freedom within the pipe in order to position the laser head to direct a laser beam to remove the scaling from the pipe. As explained, positioning of the robotic arm may be controlled by a control system that is remote from the laser tool or that is on-board the laser tool. Electronics in segments of the robotic arm react to commands from the control system to move as instructed. The robotic arm may move during application of the laser beam to the scaling. As described, the robotic arm may move in a circular pattern, a spiral pattern, or an irregular pattern In some implementations, the robotic arm may be controlled to move in up to six degrees of freedom within the metal pipe to target the scaling with the laser head. As explained with respect to FIG. 2, the six degrees of freedom include: forward and backward motion on the X-axis, left and right motion on the Y-axis, up and down motion on the Z-axis, side-to-side tilting over the X-axis, forward and backward tilting over the Y-axis, and left and right tilting over the Z-axis. The robotic arm may be controlled to move in any one of the preceding degrees of freedom, in any two of the preceding degrees of freedom, in any three of the preceding degrees of freedom, in any four of the preceding degrees of freedom, in any five of the preceding degrees of freedom, or in six of the preceding degrees of freedom. For example, linear movement towards or away from the scaling along the X-axis alone is movement in one degree of freedom. In another example, circular movement around the X-axis coupled with X-axis linear movement towards or away from the scaling is movement in two degrees of freedom. In another example, linear movement through the X, Y, and Z dimensions is movement in three degrees of freedom. In another example, movement through the X, Y, and Z dimensions having an angular component around the Y-axis is movement in four degrees of freedom. In another example, movement through the X, Y, and Z dimensions having angular components around the Y-axis and the Z-axis is movement in five degrees of freedom. Movement through the X, Y, and Z dimensions having angular components around the X-axis, the Y-axis, and the Z-axis is movement in six degrees of freedom. Following treatment of the scaling, the laser tool may be withdrawn (57).

Figure 5:
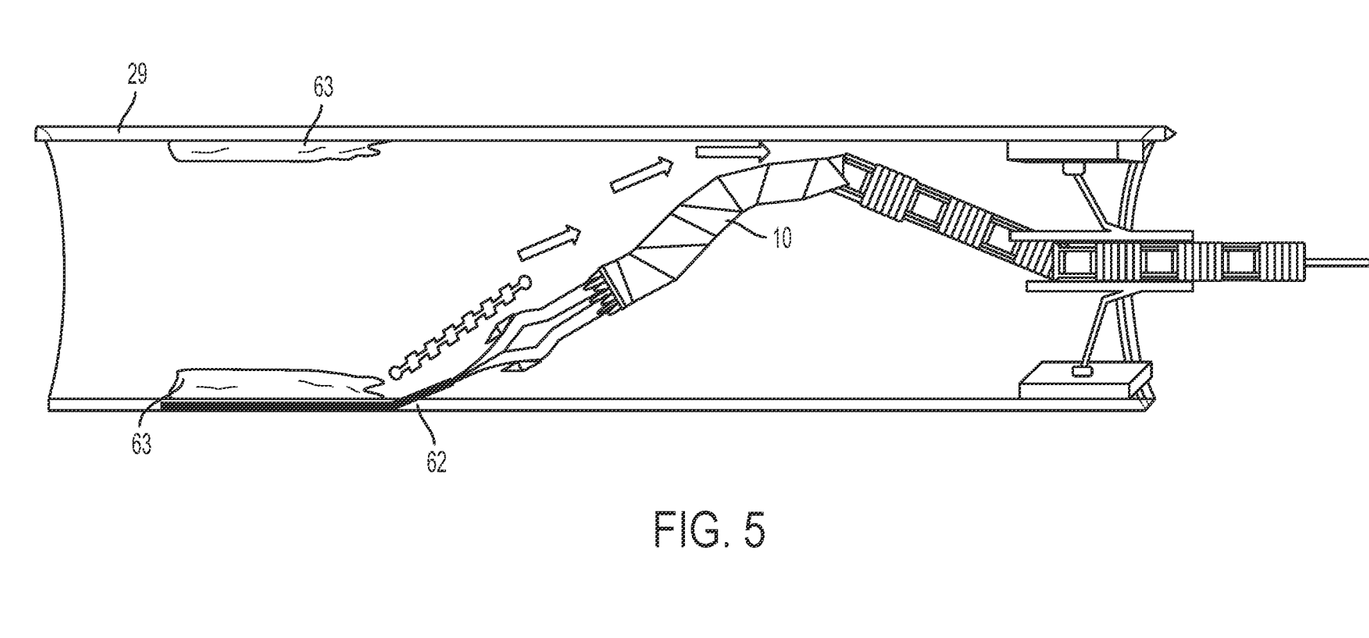
FIG. 5 is a side view of the example laser tool within the cross-section of a metal pipe targeting the metal pipe with the laser beam to remove scaling.

FIGS. 1 and 3 show laser tool 10 applying a laser beam directly to scaling 60 to remove the scaling blocking pipe 29. FIG. 5 shows using laser tool 10 applying laser beam 62 to pipe 29 itself, rather than to scaling 63. This causes the pipe to increase in temperature—for example, up to 150 degrees (°) Celsius (C). This may also result in removal of the scaling for the following reasons. The metal that comprises the pipe heats by application of the laser beam. This heating causes the metal to expand. The scale will experience some heating as well, but will expand at a different rate than the metal. The difference in expansion rates of the metal and the scaling causes the scaling to peel away from the pipe. The scaling may then be carried away by purging media or vacuum. This type of removal may be particularly effective where scaling coats, rather than blocks, a pipe.

As noted, after the scaling has been removed, the laser tool may be extracted from the pipe using the coiled tubing unit, the wireline, or the tractor. In cases where the laser tool is operating downhole within a well, the laser tool is also be brought uphole.

Examples of scaling that may be removed using the laser tool includes calcite, aragonite, vaterite, anhydrite, gypsum, barite, celestite, mackinawite (iron sulfide), pyrite, halite, fluorite, sphaerite, and galena.

Examples of other objects from which the laser tool may remove scaling include casings, tubing, valves, pumps, downhole completion tools, sub-surface safety valves, screens, gravel packs, and perforations.

All or part of the tools and processes described in this specification and their various modifications may be controlled at least in part by a control system comprised of one or more computing systems using one or more computer programs. Examples of computing systems include, either alone or in combination, one or more desktop computers, laptop computers, servers, server farms, and mobile computing devices such as smartphones, features phones, and tablet computers.

The computer programs may be tangibly embodied in one or more information carriers, such as in one or more non-transitory machine-readable storage media. A computer program can be written in any form of programming language, including compiled or interpreted languages, and it can be deployed as a stand-alone program or as a module, part, subroutine, or unit suitable for use in a computing environment. A computer program can be deployed to be executed on one computer system or on multiple computer systems at one site or distributed across multiple sites and interconnected by a network.

Actions associated with implementing the processes may be performed by one or more programmable processors executing one or more computer programs. All or part of the tools and processes may include special purpose logic circuitry, for example, an field programmable gate array (FPGA) or an ASIC application-specific integrated circuit (ASIC), or both.

Processors suitable for the execution of a computer program include, for example, both general and special purpose microprocessors, and include any one or more processors of any kind of digital computer. Generally, a processor will receive instructions and data from a read-only storage area or a random access storage area, or both. Components of a computer (including a server) include one or more processors for executing instructions and one or more storage area devices for storing instructions and data. Generally, a computer will also include one or more machine-readable storage media, or will be operatively coupled to receive data from, or transfer data to, or both, one or more machine-readable storage media.

Non-transitory machine-readable storage media include mass storage devices for storing data, for example, magnetic, magneto-optical disks, or optical disks. Non-transitory machine-readable storage media suitable for embodying computer program instructions and data include all forms of non-volatile storage area. Non-transitory machine-readable storage media include, for example, semiconductor storage area devices, for example, erasable programmable read-only memory (EPROM), electrically erasable programmable read-only memory (EEPROM), and flash storage area devices. Non-transitory machine-readable storage media include, for example, magnetic disks such as internal hard disks or removable disks, magneto-optical disks, and CD (compact disc) ROM (read only memory) and DVD (digital versatile disk) ROM.

Each computing device may include a hard drive for storing data and computer programs, one or more processing devices (for example, a microprocessor), and memory (for example, RAM) for executing computer programs. Each computing device may include an image capture device, such as a still camera or video camera. The image capture device may be built-in or simply accessible to the computing device.

Elements of different implementations described may be combined to form other implementations not specifically set forth previously. Elements may be left out of the tools and processes described without adversely affecting their operation or operation of the overall system in general. Furthermore, various separate elements may be combined into one or more individual elements to perform the functions described in this specification.

Other implementations not specifically described in this specification are also within the scope of the following claims.

What is claimed is:

1. A method of removing scaling from an object within a confined space using a laser tool comprised of a robotic arm having segments and a laser head connected to the robotic arm to output a laser beam, the method comprising:
   moving the laser tool into the confined space; and
   controlling the segments of the robotic arm with a plurality of motors such that the robotic arm moves in at least three degrees of freedom within the confined space in order to direct a laser beam output by the laser head connected to the robotic arm to remove the scaling from the object, the at least three degrees of freedom including surge, roll and one or more of: sway, heave, pitch, and yaw,
   wherein each segment of the robotic arm is associated with a corresponding motor of the plurality of motors.

2. The method of claim 1, where controlling the robotic arm comprises controlling the robotic arm to move in at least six degrees of freedom, the at least six degrees of freedom including surge, roll, sway, heave, pitch, and yaw.

3. The method of claim 1, where controlling the robotic arm comprises sending at least one command from a control system to electronics located in the segments of the robotic arm.

4. The method of claim 1, where the object comprises at least one of a pump, a sub-surface safety valve, a screen, and a gravel pack.

5. The method of claim 1, where directing the laser beam for removal of the scaling comprises pointing the laser beam at the scaling.

6. The method of claim 1, where directing the laser beam for removal of the scaling comprises pointing the laser beam at a surface of the object adjacent to the scaling.

7. The method of claim 1, where the scaling removed from the object is suctioned away from the laser head using a vacuum.

8. The method of claim 1, where controlling the robotic arm comprises moving the robotic arm in a spiral pattern.

9. The method of claim 1, where controlling the robotic arm comprises moving the robotic arm in a circular pattern.

10. The method of claim 1, further comprising:
    outputting a purging medium towards the scaling during removal of the scaling by the laser tool.

11. The method of claim 1, further comprising:
    monitoring environmental conditions within the confined space during removal of the scaling by the laser tool;
    where control over the robotic arm is based, at least in part, on the environmental conditions.

12. The method of claim 11, where the environmental conditions comprise one or more a temperature within the confined space, pressure within the confined space, or sound within the confined space.

13. The method of claim 11, further comprising:
    securing at least part of the robotic arm against the object during removal of the scaling.

14. The method of claim 13, where the at least part of the robotic arm is centered within the confined space during removal of the scaling.

15. The method of claim 1, where an optical power of the laser beam is between 1 kilowatt (kW) and 10 kW.

16. The method of claim 1, further comprising:
    shaping the laser beam prior to output, where shaping the laser beam comprises at least one of focusing the laser beam, collimating the laser beam, or dispersing the laser beam.

17. The method of claim 1, where the object is a metal pipe; and
    where the confined space is an interior of the metal pipe.

18. The method of claim 1, further comprising assembling the laser tool prior to moving the laser tool,
    wherein the laser tool comprises a length in a range from about 1 meter to about 7 meters.

19. The method of claim 1, further comprising activating a stabilizer to secure part of the robotic arm of the laser tool to an inner surface of the confined space.

20. The method of claim 19, further comprising:
    rotating the robotic arm within the stabilizer; and
    translating the robotic arm through the stabilizer.

21. The method of claim 19, wherein:
    the robotic arm includes a first part and a second part adjacent to the first part;
    the stabilizer comprises a holder that limits movement of a first part of the robotic arm to rotational and translational movement within the holder; and
    controlling the robotic arm comprises:
       controlling the first part of the robotic arm to rotate and translate within the holder; and
       controlling a second part of the robotic arm, adjacent to the first part, to move in the at least three degrees of freedom.

22. The method of claim 21, wherein the stabilizer further comprises support arms connected to the holder, the support arms being controllable to move relative to the robotic arm.

23. The method of claim 21, where controlling the second part of the robotic arm comprises controlling the second part of the robotic arm to move in at least six degrees of freedom, the at least six degrees of freedom including surge, roll, sway, heave, pitch, and yaw.

* * * * *